INVENTORS
DAVID P. BLOOMFIELD
WILLIAM J. OLSSON

BY Edmund C. Meisinger
ATTORNEY

United States Patent Office 3,649,360
Patented Mar. 14, 1972

3,649,360
COMBINED WATER REMOVAL AND HYDROGEN GENERATION FUEL CELL POWERPLANT
David P. Bloomfield, West Hartford, and William J. Olsson, Glastonbury, Conn., assignors to United Aircraft Corporation, East Hartford, Conn.
Filed Jan. 16, 1970, Ser. No. 3,409
Int. Cl. H01m 27/14
U.S. Cl. 136—86 C
9 Claims

ABSTRACT OF THE DISCLOSURE

The disclosure concerns a fuel cell and a metal hydride bed within a casing. The fuel cell requires hydrogen for the fuel at the anode. Water vapor, the byproduct of the electrochemical reaction, may be evolved through the anode and diffused to the metal hydride bed within the casing where the water vapor and metal hydride react to generate hydrogen. Hydrogen diffuses to the anode. This self-contained system requires no external controlling devices or moving parts. A feature of this system lies in the provision of supplementary water vapor through a specially tapered wick connected to an external water reservoir.

BACKGROUND OF THE INVENTION

This invention relates to fuel cells adapted to the direct conversion of chemical energy into electrical energy. More specifically, the invention concerns a fuel cell and hydrogen generator which is essentally self-controlling.

Fuel cells generally utilize hydrogen as the preferred fuel and oxygen or oxygen in air as the oxidant. In an effort to make fuel cells commercially attractive, considerable efforts have been expended in the area of converting readily available hydrocarbon fuels into hydrogen for use as the fuel in the fuel cells. Systems for converting hydrocarbon feedstocks into hydrogen have been taught in the art. These systems require separators, controls and are generally complex. It has been estimated that the cost of the controls for a given fuel cell system could run as high as one third of the overall cost of the system. Thus, it is apparent that simplicity of system and control are highly desirable features.

Eidensohn U.S. Pat. No. 3,133,837 recycles hydrogen containing product water to a hydride bed where the hydride decomposes liberating hydrogen for consumption in the fuel cell. This system utilizes a closed circuit between the hydride bed and the fuel cell. This system senses hydrogen pressure and utilizes that pressure to control the operation of a pump. In this manner, the control of the system is intended to be automatic. Other patents cite the use of product water vapor for producing either the oxygen or hydrogen reactants for the fuel cell.

In low power, long life fuel cell systems, the use of metal hydrides to generate hydrogen has distinct advantages. Such a system would be extremely useful for an application where a reliable source of direct current electricity is required to activate motors, transmitters, lights and heaters for applications such as buoys, communications balloons and army ground portable units. Cost is a factor in determining practicality of these systems. Consequently, a control scheme which is simple, reliable and inexpensive is an important facet of these systems.

SUMMARY OF THE INVENTION

It is an object of this invention to provide an improved method of controlling a combined fuel cell and hydrogen generator system.

Another object of this invention is the provision of a static water removal and hydrogen generation system where the water vapor generated in the fuel cell electrochemical reaction may diffuse through the anode to a hydrogen producing compound where the water vapor combines with the compound to liberate the hydrogen which is consumed by the fuel cell. An aspect of this invention concerns a specially designed wick whereby water evaporates into the system to compensate for variations in the water vapor pressure within the system.

A further object of this invention relates to the replenishment of water vapor which may be lost from the system by means of a high response wick which is dependent on the design of the wick and the total pressure of the gasses in the system.

A still further object concerns the adaptation of the invention to both reactants required by the fuel cell.

In accordance with this invention, a hydrogen producing compound i.e. a hydride, is disposed within the cavity in an outer casing and open to the anode of the fuel cell. Product water diffuses from the fuel cell electrolyte through the anode to the hydrogen producing compound where the water vapor combines with the compound to produce hydrogen. Hydrogen diffuses to the anode where hydrogen is consumed. If water vapor evolves through the cathode, water can be lost from the system. A water reservoir is disposed external to the cavity having a wick extending into the cavity. If water vapor is lost from the cavity and hydrogen is consumed, total pressure in the cavity decreases and the interface in the wick is adjusted due to the pressure differential across the wick. Reduced water vapor partial pressure in the cavity allows additional water vapor to evaporate from the wick into the cavity thereby generating additional hydrogen from the hydride bed. If the total pressure in the anode cavity increases, water from the reservoir will be pushed back into the specially shaped wick. The wick is designed so that the diffusional cross-sectional area increases in the direction of the hydride bed. At the same time the wick is designed so that the diffusion path length is reduced as water is drawn into the wick. The liquid/vapor interface in the wick moves toward the hydrogen producing compound as pressure decreases. Selection of increased wick area and decreased diffusion path length in the direction of the hydride bed, results in rapid response and maintains the fuel cell water balance within acceptable limits independent of environmental conditions.

DESCRIPTION OF THE PREFERRED EMBODIMENT

Figure 1:
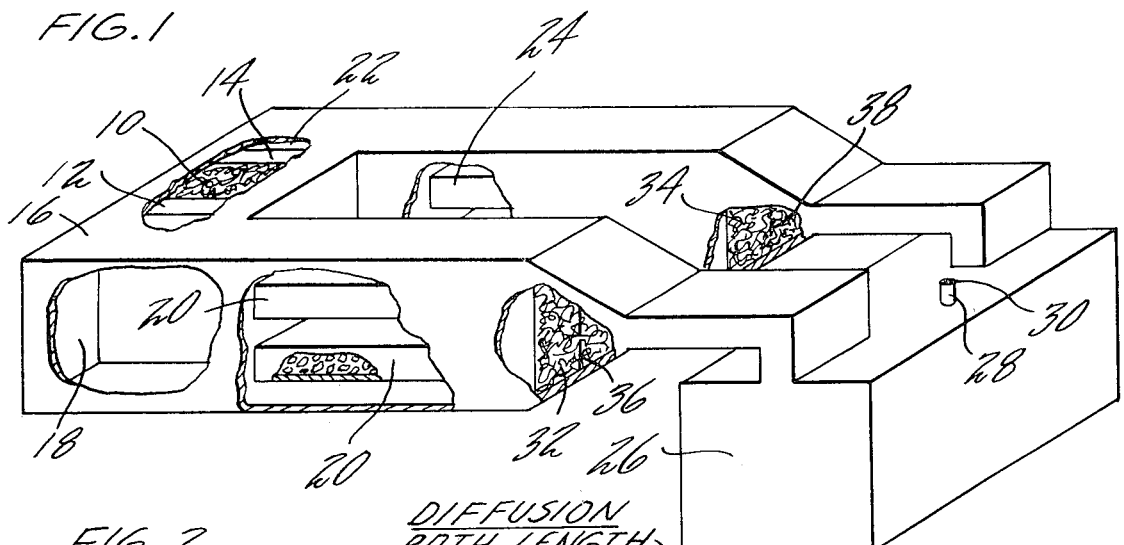
FIG. 1 is a prespective view of a system showing an embodiment of the present invention.

Referring now to FIG. 1, a single fuel cell is shown having a matrix 10 containing electrolyte, an anode 12 and a cathode 14. The fuel cell is enclosed within an outer casing 16 having an anode compartment 18. The anode compartment 18 is open to hydrogen producing compound beds 20 disposed within the casing. Water vapor which may evolve through the anode is free to diffuse to the hydrogen producing compound bed where the water vapor chemically combines with a compound to produce hydrogen. Typical hydrogen producing compounds are metallic hydrides such as: calcium hydride, lithium hydride, magnesium hydride, sodium hydride and potassium hydride. While these hydrides are preferred, any other compound which produces hydrogen upon reaction with water vapor could be used. As hydrogen is evolved from the hydride bed the hydrogen diffuses to the anode 12 where hydrogen is used as the fuel for the electrochemical reaction occurring in the fuel cell. The fuel cell processes are known and will not be described herein. If water vapor is lost through the cathode to the cathode compartment 22, the water vapor may diffuse to an oxygen producing compound bed 24 such as calcium superoxide. Reaction of water vapor with calcium superoxide produces oxygen which can be consumed at the cathode. In this dual bed system, the water vapor can be evolved through either electrode into either the anode compartment or the cathode compartment.

An appropriate water reservoir 26 is provided to replenish water within either the anode or cathode compartment. This water reservoir is preferably an aqueous solution of dilute electrolyte in order to reduce the water vapor partial pressure in the atmosphere above the electrolyte in the reservoir. Use of dilute electrolyte to replenish water serves the function of providing long life and minimize the loss of water from the reservoir through normal evaporation through vent 28 when the system is not in use. Electrolytes which are preferred are dilute phosphoric acid, sulfuric acid and potassium hydroxide. The vent to this cavity 28 may be provided with a small opening 30 to further minimize water vapor evaporation losses. A wick 32 extends from the anode cavity compartment into the reservoir and a similar wick 34 is provided from the reservoir to the cathode cavity. These wicks are specially shaped in order to provide high response to pressure changes within the compartments 18 and 22. The wicks have a tapered section increasing cross-sectional area in the direction away from the water reservoir. Water interface 36 is shown in wick 32 and water interface 38 is shown in wick 34.

Figure 2:
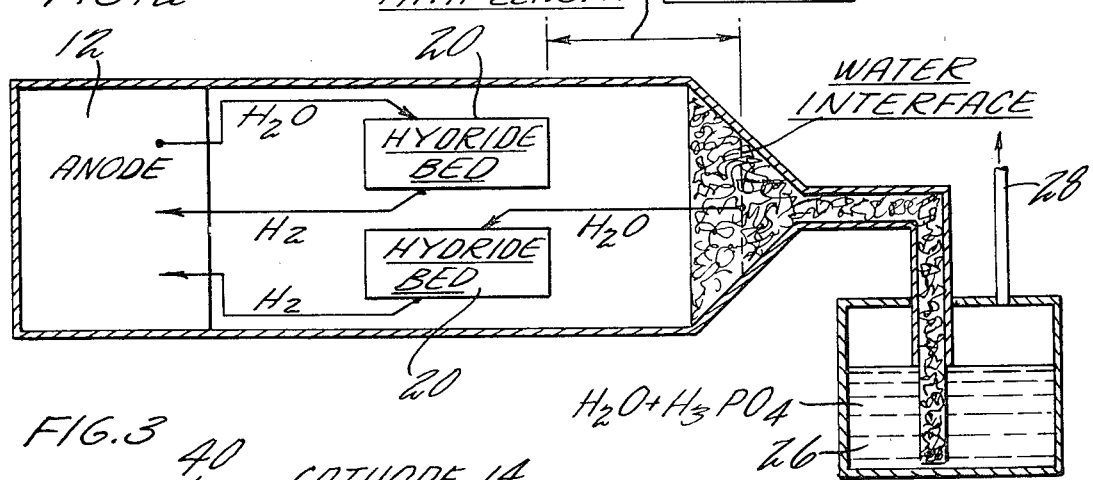
FIG. 2 is a schematic section through FIG. 1 showing hydrogen and water vapor diffusion.

Referring to FIG. 2, the anode 12 is shown as evolving water vapor which diffuses to the hydride bed 20 where hydrogen is evolved. Hydrogen diffuses back to the anode for consumption. As water vapor partial pressure in the compartment decreases (due to water vapor evolution through the cathode for example) and as hydrogen is consumed, the total pressure in the anode compartment decreases allowing the liquid/vapor interface 36 to move forward (i.e. to the left). The specially shaped wick has an increased cross-sectional area as the interface location moves forward. Increased interface area allows more rapid diffusion of water vapor into the cavity. Similarly, as the liquid/vapor interface moves forward towards the hydride bed, increasing amounts of water vapor diffuse from the wick to the compartment because the diffusion path length is reduced. The increased cross-sectional area and decreased diffusion path length individually and jointly result in rapid response to changes in the total pressure within the cavity. Diffusion of water vapor into the compartment results in production of hydrogen and a corresponding increase in total pressure. The increase in total pressure pushes the interface 36 to the right thereby reducing water vapor diffusion into the compartment. The system is static and self compensating. While FIG. 2 shows the operation of the water vapor control mechanism with respect to the anode compartment the same general approach also applies to the cathode compartment if an oxygen producing compound bed is used.

In the operation of this system, the only control needed is the static wicking control system as disclosed. It is apparent that the oxygen compartment need not be exposed to an oxygen producing compound since air may provide the oxygen requirements of the cathode.

Figure 3:
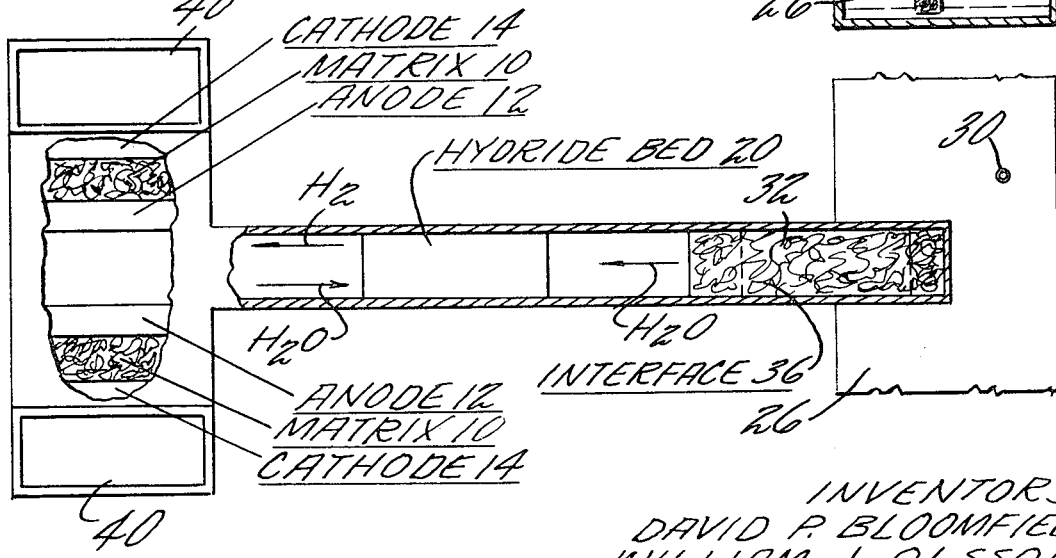
FIG. 3 is a modified showing of the FIG. 1 embodiment having two cells with the cathode compartments open to the atmosphere.

FIG. 3 is a schematic top view of a back-to-back fuel cell arrangement having the hydrogen producing compound in the bed 20. In this system the specially shaped wick 32 is shown having interface 36. This wick has been shown as two dimensional but a conical wick design or other variations can be used. The wick extends into the water reservoir 26 which may be a dilute aqueous solution of phosphoric acid. As water vapor is provided to the hydride bed 20, hydrogen is generated and diffuses to the anodes 12 of the two cells. The anodes are separated from the cathodes 14 by matrices 10. In this cell, water vapor may diffuse back to the hydride bed from the matrix through anode 12 as shown to assist in producing the hydrogen fuel used in the two cells. Whatever water vapor is lost through cathodes 14 to the atmosphere through chambers 40 is replaced by water vapor supplied to the beds through the wicking 32.

Fuel cell water balance is maintained within acceptable limits and independent of the environmental conditions. The selection of the type fuel cell is not important since the invention is applicable to either base or acid electrolyte fuel cells. Acid fuel cells may be preferred since acid cells are resistant to carbon dioxide in the air stream if the cathode is open to atmosphere. However, a carbon dioxide scrubber could be used with a base cell when air is supplied as the oxidant stream for the fuel cell cathodes. As has been described, decreased total pressure within the compartments results in a liquid/water vapor interface movement toward the hydride bed resulting in increased water vapor being diffused into the compartments. Conversely, an increased pressure within the cavity will drive the interface location to the right to a decreased area and an increased diffusion path length position, resulting in a significantly reduced water vapor diffusion into the cavity. Consequently, this arrangement results in maximum response to changing conditions within the anode cavity without external controls. The present invention presents a novel mechanism for controlling the operation of a fuel cell system. In addition, no controls or pressure regulators are required to maintain the reactant pressures for water removal. The system is entirely static in that no moving parts are required.

Prior to use, the system could be provided with membranes impermeable to water vapor to isolate the components, for example, on both sides of the hydrogen producing compound bed (and the oxygen producing compound bed if used). These membranes will permit extended storage of the system. Start up could consist of applying pressure to burst the membranes. The system has certain limitations but can be useful for many practical applications. The life and operating limitations can be modified significantly by appropriately shaping the wicks and sizing the hydride bed.

Although the invention has been shown and described with respect to a preferred embodiment, it should be understood by those skilled in the art that various changes and omissions in the form and detail may be made herein without departing from the spirit and the scope of the invention.

We claim:
1. In combination a static water removal and reactant generation system for a fuel cell power plant comprising:
   an outer casing having a cavity therein;
   a fuel cell disposed within the casing having an anode and a cathode, the anode being open to the cavity within the casing the cathode being closed to the cavity;
   a hydrogen producing compound disposed within the casing and exposed to the fuel cell anode such that water vapor in the cavity may combine with the compound to generate hydrogen which diffuses to the fuel cell anode where hydrogen is consumed in the electrochemical reaction occurring in the fuel cell; and
   a water reservoir containing water external to the casing having a wick extending from the reservoir into the casing whereby water is drawn into the wick as the total pressure in the cavity decreases thereby allowing increased water vapor diffusion to the cavity to generate additional hydrogen.

2. The system as in claim 1 wherein the hydrogen producing compound is a metal hydride selected from the group consisting of calcium hydride, lithium hydride, magnesium hydride, sodium hydride, and potassium hydride.

3. The system as in claim 2 where the water reservoir contains a solution of aqueous electrolyte selected from the group consisting of dilute phosphoric acid, sulfuric acid and potassium hydroxide.

4. The system as in claim 3 where the water vapor diffusion path length to the metal hydride decreases as water is drawn into the wick extending into the cavity.

5. The system as in claim 3 wherein the wick cross-sectional area within the casing increases in the direction of the hydride bed.

6. The system as in claim 3 wherein the wick cross-sectional area within the casing increases in the direction of the hydride bed and as water is drawn into the wick the diffusion path length to the metal hydride bed decreases.

7. The system as in claim 6 wherein the cathode is open to atmosphere outside the casing.

8. The system as in claim 6 wherein the cathode is open to a second cavity within the casing, the second cavity having an oxygen producing compound bed whereby water vapor in the second cavity reacts with the oxygen producing compound to produce oxygen which diffuses to the cathode of the fuel cell where the oxygen is consumed.

9. The system as in claim 8 including a second wick from the second cavity into the water reservoir the wick having an increased cross-sectional area within the second casing in the direction of the oxygen producing compound bed and a decreased diffusion path length in the direction of the oxygen producing compound bed.

References Cited

UNITED STATES PATENTS

| | | | |
|---|---|---|---|
| 3,098,768 | 7/1963 | Titterington et al. | 136—86 C |
| 3,134,697 | 5/1964 | Niedrach | 136—86 F |
| 3,442,712 | 5/1969 | Roberts, Jr. | 136—86 R |
| 3,453,146 | 7/1969 | Bawa et al. | 136—86 F |
| 3,519,486 | 7/1970 | Huebscher et al. | 136—86 R |

ALLEN B. CURTIS, Primary Examiner

U.S. Cl. X.R.

23—211, 282